(12) United States Patent
Coleman et al.

(10) Patent No.: US 9,106,763 B2
(45) Date of Patent: Aug. 11, 2015

(54) ADVERTISING RINGTONE COVERAGE

(75) Inventors: Michael J. Coleman, Winchester (GB);
Alok Jain, Gurgaon (IN); Matthew D. Whitbourne, Horndean (GB)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 13/090,555

(22) Filed: Apr. 20, 2011

(65) Prior Publication Data

US 2011/0300838 A1 Dec. 8, 2011

(51) Int. Cl.
*G06Q 10/00* (2012.01)
*H04M 1/725* (2006.01)
*G06Q 30/02* (2012.01)

(52) U.S. Cl.
CPC ....... *H04M 1/72569* (2013.01); *G06Q 30/0242* (2013.01); *H04M 1/7253* (2013.01)

(58) Field of Classification Search
CPC ............ H04M 3/42017; G06Q 30/251; G06Q 30/0261; G06Q 30/0267
USPC ...................... 455/414.2; 705/7.29
See application file for complete search history.

(56) References Cited

U.S. PATENT DOCUMENTS

2006/0059277 A1* 3/2006 Zito et al. .......... 710/15
2008/0120176 A1* 5/2008 Batni et al. .......... 705/14
2008/0167921 A1* 7/2008 Seo et al. ........... 705/7
2008/0281668 A1* 11/2008 Nurminen .......... 705/10

OTHER PUBLICATIONS

IBM, "Method for Delivering Audio Advertisements Through Cellular Phones", Ip.com, Inc., Nov. 26, 2009, IP.com No. IPCOM000190384D, 3 pages. www.ip.com.

* cited by examiner

*Primary Examiner* — Rafael Pérez-Gutiérrez
*Assistant Examiner* — Joshua Schwartz
(74) *Attorney, Agent, or Firm* — Yee & Associates, P.C.; Parashos T. Kalaitzis

(57) ABSTRACT

An apparatus, method and computer program for quantifying coverage of an advertising ringtone in a telephony system, the apparatus comprising: a receive component for receiving a request for an electronic device; a generate component, responsive to the receiver receiving the request, for playing the advertising ringtone on the electronic device; and a monitor component, responsive to the electronic device playing the advertising ringtone, for collecting coverage information from a personal device, wherein the monitor component comprises: a proximity component for identifying a local electronic resource; a select component, responsive to the proximity component identifying the local electronic resource, for determining the local electronic resource is the personal device; and a gather component, responsive to the select component determining the personal device, for gathering coverage information from the personal device.

20 Claims, 4 Drawing Sheets

ADVERTISING RINGTONE COVERAGE

BACKGROUND

1. Field

The present invention relates to a telephony system. In particular, the present invention relates to an apparatus and method for quantifying coverage of an advertising ringtone in a telephony system.

2. Description of the Related Art

Cellular phones are increasingly becoming used for a variety of rich media purposes, such as taking photographs, playing music and performing more complex computational tasks. As such, advertisers are now viewing the mobile platform as a medium not just for displaying adverts, but broadcasting them to a wider group of people.

Third parties, such as advertisers, are increasingly seeking detailed information about phone calls. For example, advertisers may wish to find the effect of their campaigns, and to influence the use of their advertisements.

When a user sends a call to another user's phone, an advertisement can be provided as a ringtone on the call sender's phone, so that the call sender will listen to the advertisement until the call recipient picks up the phone. In exchange for listening to the advertisement the call sender receives a monetary benefit, for example a discount on the call, or free text messages.

An example of prior art that suggests the concept of compensating the call recipient for using their device as an advertising platform is to be found in US Patent Publication US 2008-0167921 A1 (Seo, Mi Jung, et. al. "Advertisement Method Using Ring Tone Providing Service and Advertisement System Thereof, And Computer-Readable Media for Recording Advertisement Method Program").

Information can be provided to the advertiser on how many times the advertisement has been played, and for how long. However, no coverage information is provided to assess the penetration of the advertisement.

Therefore, there is a need in the art to address the aforementioned problem.

SUMMARY

Viewed from a first aspect the present invention provides an apparatus for quantifying coverage of an advertising ringtone in a telephony system, the apparatus comprising: a receive component for receiving a request for an electronic device; a generate component, responsive to the receiver receiving the request, for playing the advertising ringtone on the electronic device; and a monitor component, responsive to the electronic device playing the advertising ringtone, for collecting coverage information from a personal device, wherein the monitor component comprises: a proximity component for identifying a local electronic resource; a select component, responsive to the proximity component identifying the local electronic resource, for determining the local electronic resource is the personal device; and a gather component, responsive to the select component determining the personal device, for gathering coverage information from the personal device.

Preferably, the present invention provides an apparatus, wherein the monitor is further operable for gathering coverage information from the electronic device.

Preferably, the present invention provides an apparatus, wherein the apparatus further comprises: a collate component, responsive to the gather component gathering coverage information from at least one of the electronic device and the personal device, for collating the coverage information; and a send component for sending the collated coverage information.

Preferably, the present invention provides an apparatus, wherein the apparatus further comprises: a sensor for transmitting a transmittal signal to the local electronic resource, and for receiving a received signal from the local electronic resource.

Preferably, the present invention provides an apparatus, wherein the transmittal signal and the received signal are Bluetooth signals. Alternatively, the present invention provides an apparatus, wherein the transmitted signal and the received signal are global positioning signals.

Preferably, the present invention provides an apparatus, wherein the gather component is further operable for gathering coverage information from a telephony cell associated with the electronic device. Preferably, the present invention provides an apparatus, wherein the apparatus further comprises: a timer for starting a timer, and wherein the coverage information comprises time-related coverage information.

Viewed from a second aspect, the present invention provides a method for quantifying coverage of an advertising ringtone in a telephony system, the method comprising the steps of: receiving a request for an electronic device; in response to receiving the request, playing the advertising ringtone on the electronic device; and in response to playing the advertising ringtone, collecting coverage information from a personal device, wherein the step of collecting coverage information comprises the steps of: identifying a local electronic resource; in response to identifying the local electronic resource, determining the local electronic resource is the personal device; and in response to determining the personal device, gathering coverage information from the personal device.

Preferably, the present invention provides a method, wherein the step of collecting coverage information further comprises the step of gathering coverage information from the electronic device.

Preferably, the present invention provides a method, wherein the method further comprises the steps of: in response to gathering coverage information from at least one of the electronic device and the personal device, collating the coverage information; and sending the collated coverage information.

Preferably, the present invention provides a method, wherein the method further comprises the steps of: transmitting a transmittal signal to the local electronic resource, and receiving a received signal from the local electronic resource.

Preferably, the present invention provides a method, wherein the steps of transmitting a transmittal signal and receiving a received signal comprise steps of transmitting and receiving Bluetooth signals. Alternatively, the present invention provides a method, wherein the steps of transmitting a transmittal signal, and receiving a received signal comprise steps of transmitting and receiving global positioning signals.

Preferably, the present invention provides a method, wherein the method further comprises the step of gathering coverage information from a telephony cell associated with the electronic device.

Preferably, the present invention provides a method, wherein the method further comprises the step of: starting a timer, and wherein the step of gathering coverage information comprises gathering time-related coverage information.

Viewed from a third aspect, the present invention provides a computer program comprising computer code to, when loaded into a computer system and executed thereon, cause said computer system to perform all of the steps of the invention.

Advantageously, the present invention allows metrics to be provided to telephony service providers concerning phone calls on their telephony system. For example, coverage of an advertising ringtone in a telephony system advertisement penetration can be quantified, so that charging levels for advertisers can be calculated. Levels of rewards to a mobile phone owner, who allow their phones to be used to emit advertising, can also be calculated.

Advantageously, the number of personal devices, such as mobile phones, that are within range of an electronic device playing an advertising ringtone is indicative of how many people can hear the advertisement. Therefore, by measuring the number of personal devices within range of the ringing electronic device, the number of people also hearing the advertisement can be assessed, thereby assessing advertisement coverage.

Advantageously, information can also be gathered from the electronic device that the advertisement is being played on, and therefore coverage information can be associated with further parameters, for example location of the electronic device, and the volume of the electronic device.

Advantageously, the information can be collated and sent to the advertisement service provider. Advantageously, information can be gathered from local devices through an existing protocol, for example, Bluetooth signals, or through global positioning signals.

Advantageously, information can also be gathered from any associated telephony cell, which can provide locational information about the electronic device itself, for example, if the electronic device is within a shopping center. Advantageously, time-related coverage information can also be assessed.

BRIEF DESCRIPTION OF THE SEVERAL VIEWS OF THE DRAWINGS

The present invention will now be described, by way of example only, with reference to preferred embodiments, as illustrated in the following figures.

DETAILED DESCRIPTION

Figure 1:
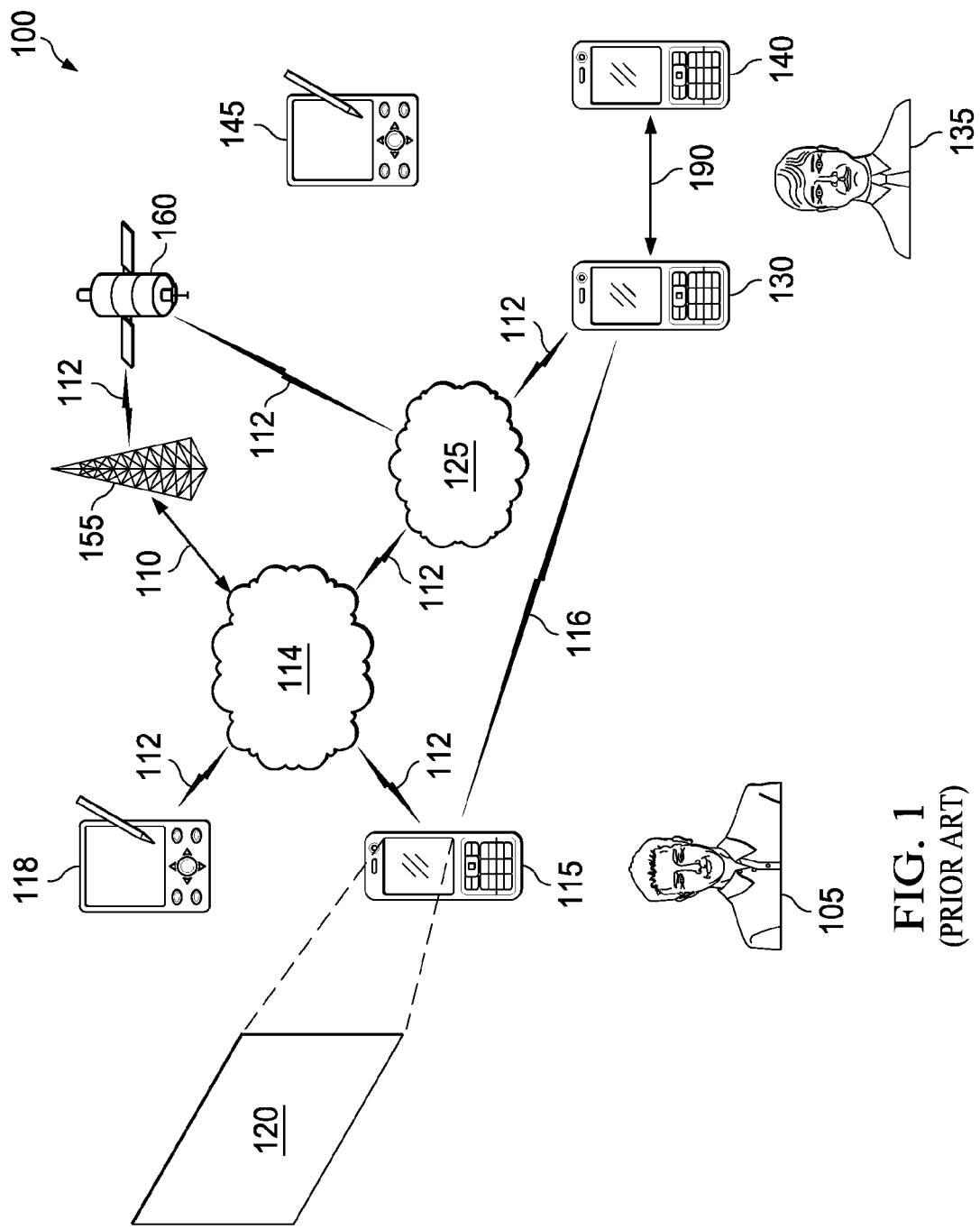
FIG. 1 is a block diagram depicting a telephony system, in accordance with the prior art, and in which a preferred embodiment of the present invention may be implemented.

FIG. 1 is a block diagram depicting a telephony system 100, in accordance with the prior art, and in which a preferred embodiment of the present invention may be implemented. The telephony system 100 comprises personal electronic devices, such as phones 115, 130, 140 and personal digital assistants (PDAs) 118 connectable through a network 114, which may comprise a wired network 110, or wireless networks 112. The telephony system 100 also comprises a telephony cell 125. The personal electronic devices 115, 118, 130 may be connectable through the network 114 through a radio mast 155 or a satellite 160. The personal electronic devices 115, 118, 130 may also be connectable through a peer-to-peer (P2P) connection 116, which may be wired or wireless. Typically, an operating system (OS) 120 is operable on the personal electronic device. A call sender 105 initiates a call from a caller personal electronic device 115 to the recipient personal electronic device 130 of a call recipient 135. Additional personal electronic devices 140, 145 may be in the physical vicinity of the recipient personal electronic device 130. These additional personal electronic devices may be connected to the same network as the recipient personal electronic device 130, may be connected to an alternative network (not shown), or may be visible to other network devices through Bluetooth or wireless connection polling. The phones 115, 130, 140 may be mobile phones, or wired phones. Personal electronic devices 115, 118, 130, 140, 145 may also be connectable to each other through alternative communication means, for example through a Wi-Fi, Bluetooth or other wireless short distance connection protocols 190.

Bluetooth is a wireless technology standard for exchanging data over short distances between electronic devices. Many electronic devices have Bluetooth technologies incorporated, for example, mobile phones, watches, modems, headsets, memory devices, and in-car electronic systems.

Figure 2:
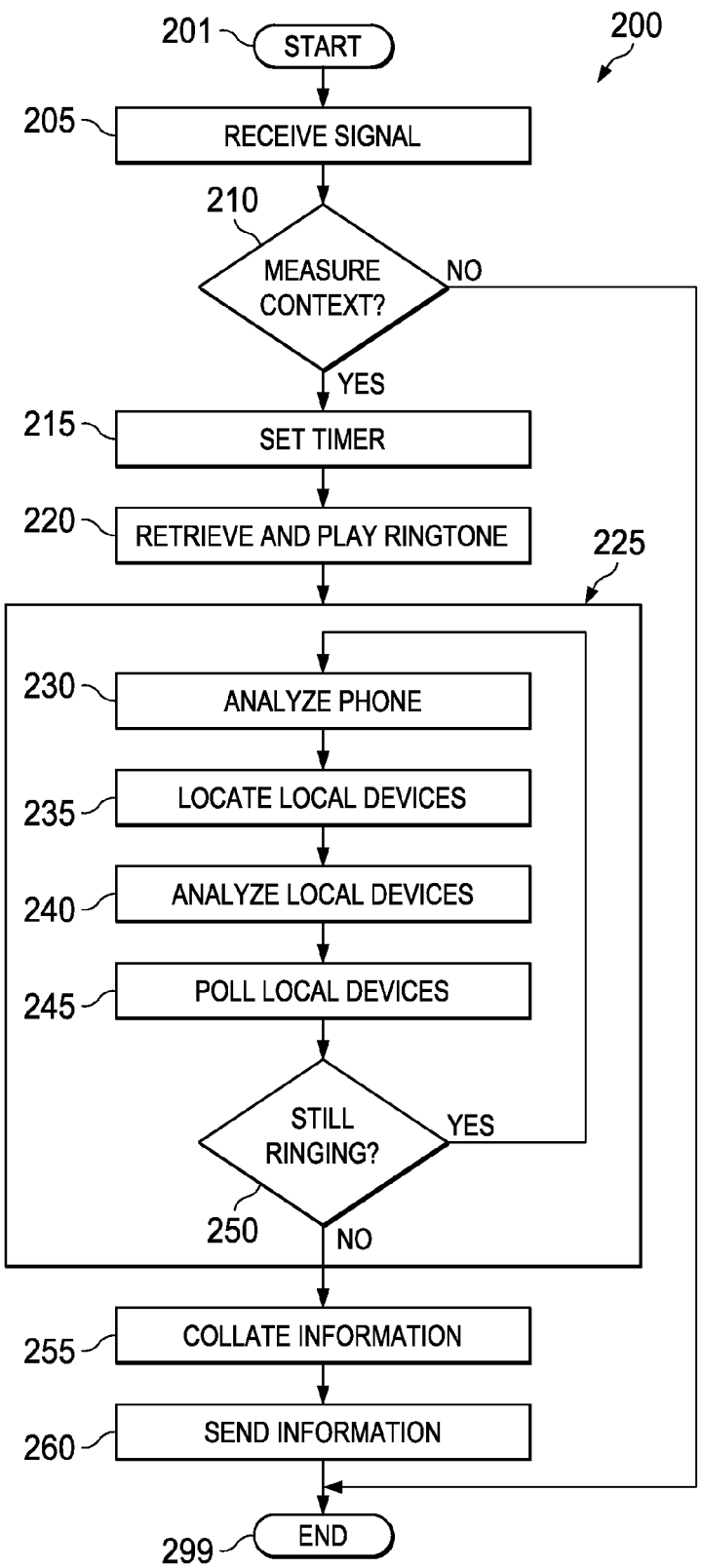
FIG. 2 is a high-level exemplary schematic flow diagram depicting operation method steps for identifying ringtone context associated with a call, in accordance with a preferred embodiment of the present invention.
Figure 3:
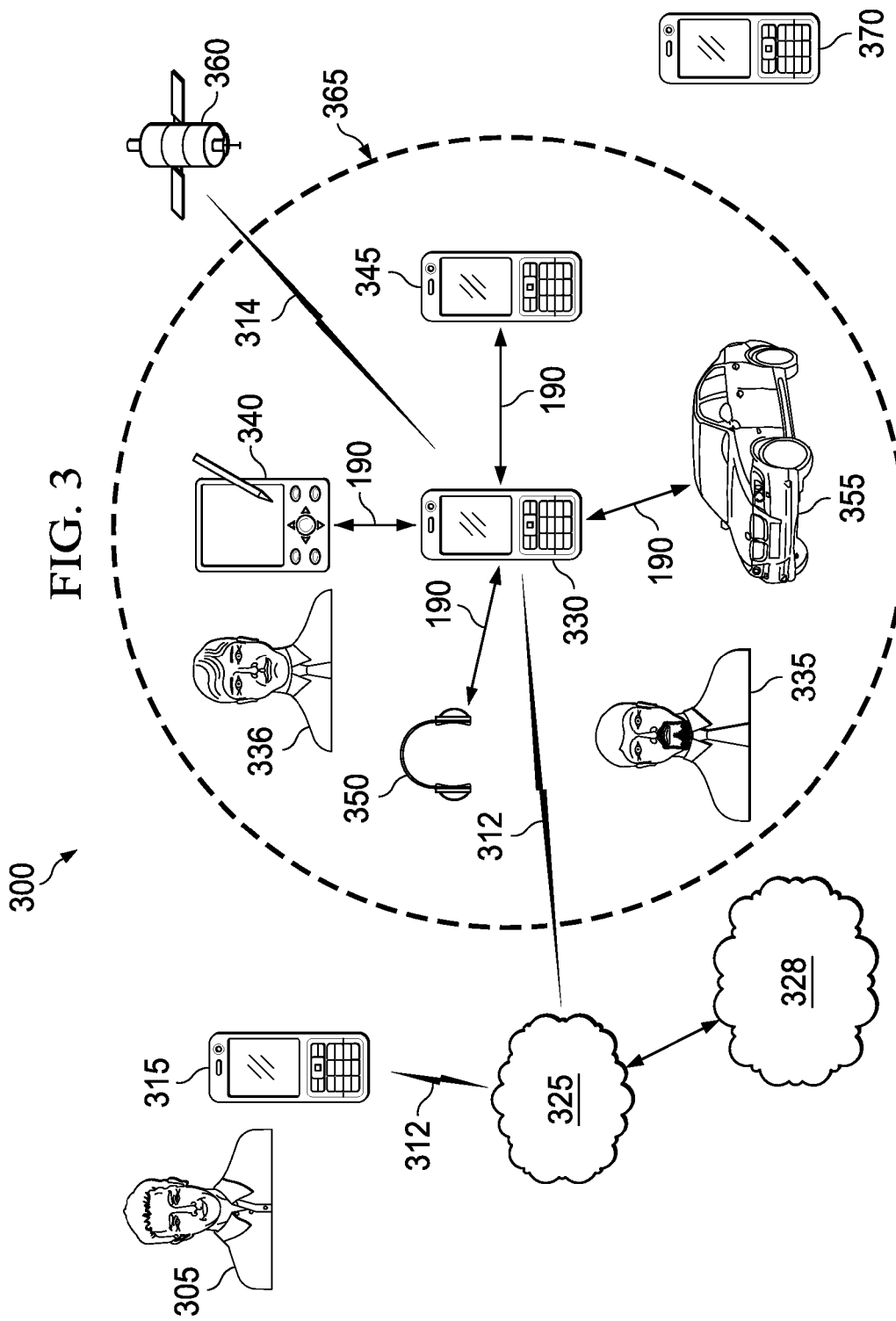
FIG. 3 is a block diagram depicting a telephony system, in accordance with a preferred embodiment of the present invention.
Figure 4:
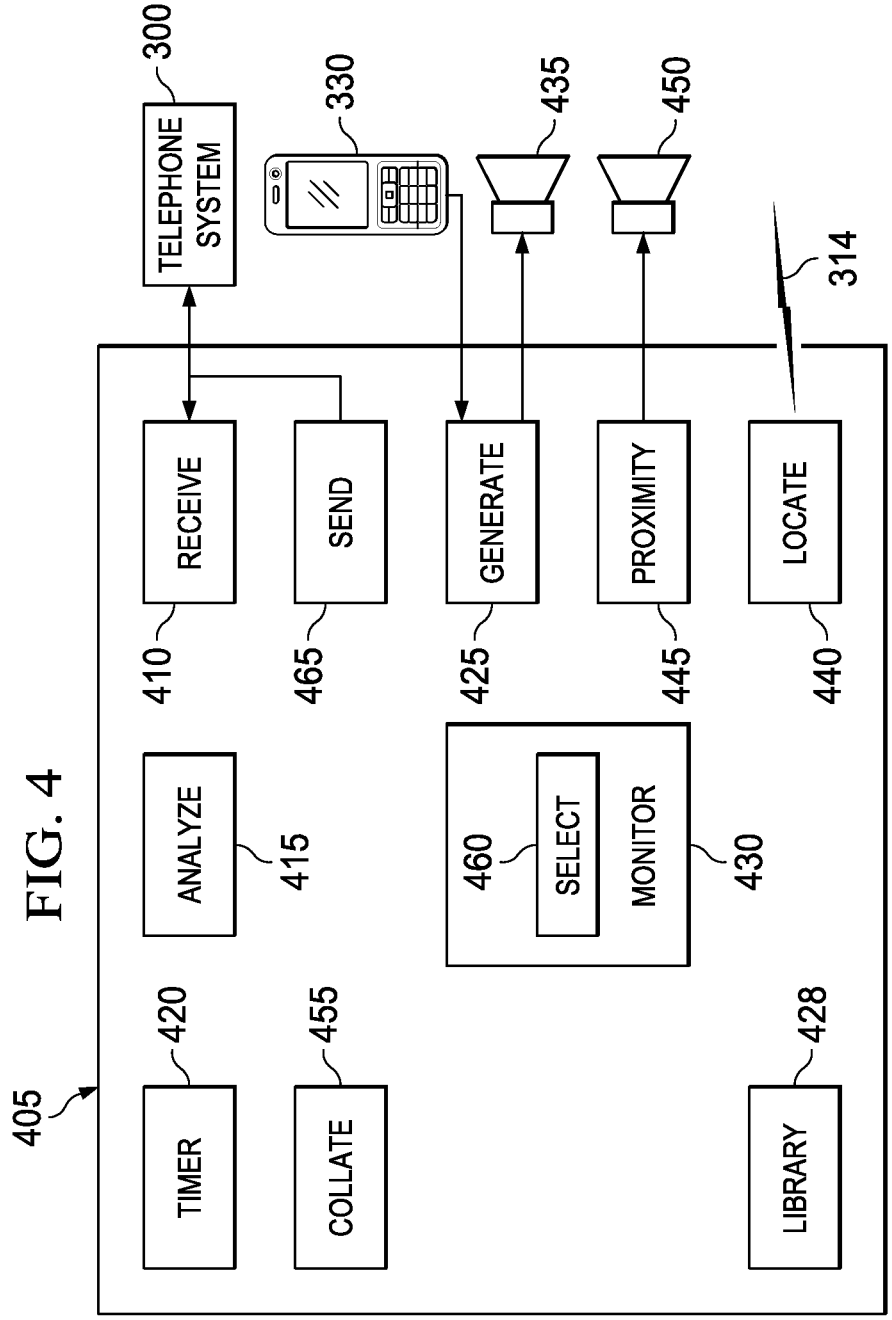
FIG. 4 depicts an apparatus operable on a mobile phone, in accordance with a preferred embodiment of the present invention.

FIG. 2, which should be read in conjunction with FIG. 3 and FIG. 4, is a high-level exemplary schematic flow diagram 200 depicting operation method steps for identifying ringtone context associated with a call, in accordance with a preferred embodiment of the present invention. FIG. 3 is a block diagram depicting a telephony system 300, in accordance with a preferred embodiment of the present invention. FIG. 4 depicts an apparatus 405 operable on a mobile phone 330, in accordance with a preferred embodiment of the present invention.

FIG. 2 is set forth as a logical flow chart diagram. As such, the depicted order and labelled steps are indicative of one embodiment of the presented method. Other steps and methods may be conceived that are equivalent in function, logic, or effect of one or more steps or portions thereof, of the illustrated method. Additionally the format and symbols employed are provided to explain the logical steps of the method and are understood not to limit the scope of the method.

The method starts at step 201. At step 205, a sender 305 initiates a call from a mobile phone 315 to a mobile phone 330 of a receiver 335. A signal is sent through wireless network 312 through a telephony cell 325. A receive component 410 operable in the apparatus 405 of the receiver mobile phone 330 receives the signal from the telephony system 300. A user profile (not shown) determines criteria for which ringtone context is to be measured. In a preferred embodiment, ringtone context is to be measured to provide coverage information concerning ringtones that carry advertisements. However, in alternative embodiments, ringtone context can be measured to provide coverage information about other aspects of the ringtone, and of the period when the ringtone is playing. For example, criteria could be established to measure ringtone context for calls received from predetermined senders, or between certain times. At step 210, an analyze component 415 analyzes the user profile, and the incoming signal to determine its content. If ringtone context is not to be measured the method ends at step 299. If ringtone context is to be measured the method moves to step 215. At step 215 a timer component 420 starts a timer. At step 220, a generate component 425 retrieves a ringtone signature from a ringtone library 428, and generates a ringtone that is played on a speaker 435 of the mobile phone 330. The ringtone is in the form of an advertisement. In a preferred embodiment, the advertisement ringtone signature is to be found in the library 428. In an alternative embodiment, the advertisement ringtone signature is encapsulated in the incoming signal.

At step 225, a monitor component 430 monitors the telephony system 300 for a ringtone context. At step 230, the monitor component 430 monitors the mobile phone 330, collecting internal coverage information. Examples of internal coverage information include:

An identification for the advertisement being played;

A length of time the ringtone is played for before the call is answered;

A volume of the ringtone for the duration of the call;

A volume capacity of the phone, through recording the make and model of that phone.

A locate component 440 also accesses a global positioning system (GPS) network 314 with a GPS satellite 360 to determine a location of the mobile phone 330. The locate component 440 also accesses the telephony cell 325 to gather locational coverage information about the telephony cell 325 and, therefore, further coverage information about the location of the mobile phone 330. The telephony cell 325 may also provide coverage information about electronic devices local to the mobile phone 330. Further locational coverage information may also be gathered from a related coverage information technology (IT) resource set, such as a computer cloud 328.

At step 235, a proximity component 445 locates local electronic devices within proximity of the mobile phone 330. This can be determined by devices identified using a short range method such as Wi-Fi or Bluetooth. Any short-distance protocol could be used, but a Bluetooth protocol will be used to illustrate the method. In a preferred embodiment, the proximity component 445 requests a Bluetooth transmitter 450 to transmit a Bluetooth signal within a Bluetooth range 365 on a Bluetooth wireless network 190. The Bluetooth signal identifies all Bluetooth enabled active electronic devices 340, 345, 350, 355 within the Bluetooth range 365. The Bluetooth signal does not identify an electronic device that is outside of the Bluetooth range 365, such as electronic device 370. At step 240, a select component 460 of the apparatus 405 analyzes any Bluetooth signals received back from local electronic devices to determine personal local electronic devices 340, 345 whose user 336 is in a position to hear the ringtone of the mobile phone 330. For example, a user of a personal digital assistant 340, or another mobile phone 345 may be able to hear the ringtone. However, a user of headphones 350, or a Bluetooth enabled car 355 may not hear the ringtone. Locational coverage information gathered by the locate component 440 is also used in the analysis to determine local electronic devices 340, 345. For example, if the location of the mobile phone 330 is a shopping center, the users of local electronic devices 340, 345 should be able to hear the ringtone, whereas, if the location can be identified as being inside a car 355, then users of local electronic devices 340, 345 outside of the car will not be able to hear the ringtone.

It will be evident to the skilled person that other methods to identify other local electronic devices, and for locational coverage information gathering, are possible. For example, the use of the GPS network 314 can also identify the location of local electronic devices 340, 345 if GPS-enabled, as well as the location of the mobile phone 330. This can be achieved through recording GPS co-ordinates for enabled mobile phones 330, 340, 345.

At step 245, the apparatus polls the determined local electronic devices 340, 345 for coverage information to determine whether ringtone context can be gathered. Coverage information is gathered from such local electronic devices 340, 345. Examples of gathered coverage information are type of device, and location of device. Coverage information is also gathered on the number of connections. Additional scoring is associated based on the type of device. At step 250, the apparatus 405 evaluates whether the ringtone is still playing. For example, if the receiver 335 has answered the mobile phone 330. If it is still playing steps 230, 235, 240, 245 are repeated to assess whether there is any change in the coverage information from local electronic devices, for example, if a local electronic device 340, 345 has moved out of Bluetooth range 365.

At step 255, the timer component 420 stops the timer. A collate component 455 collates all coverage information gathered in step 225, including any time-related coverage information. At step 260, a send component 465 sends the collated coverage information back to the network provider via the telephony cell 325. The coverage information can be augmented with server held coverage information, for example coverage information about the subscriber cell. In a preferred embodiment, the coverage information is encapsulated with call tear down coverage information, for example, the total length of the call. The appropriate compensation for the receiver 335 of the mobile phone 330 is calculated by the network provider. Alternatively, this calculation process could take place on the apparatus 405 with the results simply sent.

In an alternative embodiment, calls to action relayed via the audio advertisement can be made available using the short range protocol to allow those in ear shot to follow up on items of interest.

In an alternative embodiment, context information is gathered for the duration of the whole call, and not just for the period of time that the ringtone is playing.

In an alternative embodiment, coverage information is gathered for the duration of the ringtone period or for the duration of the whole call at the mobile phone 315 of the sender 305.

For the avoidance of doubt, the term "comprising", as used herein throughout the description and claims is not to be construed as meaning "consisting only of".

What is claimed is:

1. An electronic telephony device configured to provide voice communication with other devices and quantify coverage of an advertising ringtone in a telephony system, the electronic telephony device comprising:

a receive component configured to receive a request at the electronic telephony device;

a generate component configured to play, responsive to the receive component receiving the request, the advertising ringtone on the electronic telephony device; and a monitor component configured to selectively collect, responsive to the electronic telephony device playing the advertising ringtone, when the advertising ringtone has a ringtone context to be measured, coverage information from a personal device within proximity of the electronic telephony device, wherein the monitor component comprises:

an analyze component configured to analyze a user profile, and an incoming signal to determine its content to identify the advertising ringtone as one of to be measured and not to be measured;

a proximity component using an inaudible signal configured to use a short-distance protocol to identify that the personal device is within proximity of the electronic telephony device; and a gather component configured to gather, responsive to the proximity component identifying that the personal device is within proximity of the electronic telephony device and the advertising ringtone has a ringtone context to be measured, the coverage information from the personal device wherein the coverage information includes information comprising measuring a number of personal devices within range of the electronic telephony device playing the advertising ringtone to form a metric to be provided to telephony service providers.

2. The electronic telephony device of claim 1, wherein the monitor component is further configured to gather additional coverage information from the electronic telephony device, wherein the additional coverage information includes internal coverage information comprising an identification for an advertisement being played, a length of time the advertising ringtone is played before a call is answered, a volume of the advertising ringtone for a duration of a call, and a volume capacity of the electronic telephony device through recording a make and a model of the electronic telephony device.

3. The electronic telephony device of claim 1 further comprising:
a collate component configured to collate, responsive to the gather component gathering the coverage information from at least one of the electronic telephony device and the personal device, the coverage information;
a send component configured to send the collated coverage information; and
a user profile configured to determine criteria for which the coverage information is to be collected from the personal device by the electronic telephony device, wherein the criteria specifies a ringtone ad to be played on a speaker of the electronic telephony device.

4. The electronic telephony device of claim 1 further comprising:
a sensor configured to transmit a transmittal signal to the personal device, and to receive a received signal from the personal device wherein the signals are inaudible signals; and
wherein the coverage information gathered from the personal device comprises locational coverage information including a location of the personal device, and coverage information of a type of device, and a number of connections, wherein additional scoring is associated based on the type of device.

5. The electronic telephony device of claim 4, wherein the transmittal signal and the received signal are Bluetooth signals.

6. The electronic telephony device of claim 4, wherein the transmitted signal and the received signal are global positioning signals.

7. The electronic telephony device of claim 1, wherein the gather component is further configured to gather information indicating a location of the electronic telephony device and the personal device from a telephony cell associated with the electronic telephony device.

8. The electronic telephony device of claim 1 further comprising:
a timer component for starting a timer, and wherein the coverage information comprises time-related coverage information.

9. A method for quantifying coverage of an advertising ringtone in a telephony system, the method comprising the steps of:
receiving a request at an electronic telephony device configured to provide voice communication with other devices;
in response to receiving the request, playing the advertising ringtone on the electronic telephony device; and
in response to playing the advertising ringtone, the electronic telephony device selectively collecting coverage information from a personal device in response to the advertising ringtone having a ringtone context to be measured, wherein the step of collecting coverage information comprises the steps of:
analyzing a user profile and an incoming signal to determine its content to identify the advertising ringtone as one of to be measured and not to be measured;
identifying the personal device using an inaudible signal configured to use a short-distance protocol; and
in response to identifying the personal device and identifying the advertising ringtone as to be measured, the electronic telephony device gathering the coverage information from the personal device wherein the coverage information includes information comprising measuring a number of personal devices within range of the electronic telephony device playing the advertising ringtone to form a metric to be provided to telephony service providers.

10. The method of claim 9, wherein the step of collecting coverage information further comprises the step of gathering additional coverage information from the electronic telephony device, wherein the additional coverage information includes internal coverage information comprising an identification for an advertisement being played, a length of time the advertising ringtone is played before a call is answered, a volume of the advertising ringtone for a duration of a call, and a volume capacity of the electronic telephony device through recording a make and a model of the electronic telephony device.

11. The method of claim 9, wherein the method further comprises the steps of:
in response to gathering the coverage information from at least one of the electronic telephony device and the personal device, collating the coverage information;
sending the collated coverage information; and
a user profile usable for determining criteria for which the coverage information is to be collected from the personal device by the electronic telephony device, wherein the criteria specify a ringtone ad to be played on a speaker of the electronic telephony device.

12. The method of claim 9, wherein the method further comprises the steps of:
transmitting a transmittal signal to the personal device, and receiving a received signal from the personal device wherein the signals are inaudible signals; and
wherein the coverage information gathered from the personal device comprises locational coverage information including a location of the personal device, and coverage information of a type of device, and a number of connections, wherein additional scoring is associated based on the type of device.

13. The method of claim 12, wherein the steps of transmitting a transmittal signal and receiving a received signal comprise steps of transmitting and receiving Bluetooth signals.

14. The method of claim 12, wherein the steps of transmitting a transmittal signal and receiving a received signal comprise steps of transmitting and receiving global positioning signals.

15. The method of claim 9, wherein the method further comprises the step of:

gathering information indicating a location of the electronic telephony device and the personal device from a telephony cell associated with the electronic telephony device.

16. The method of claim 9, wherein the method further comprises the step of:
starting a timer, and
wherein the step of gathering coverage information comprises gathering time-related coverage information.

17. A computer program product for quantifying coverage of an advertising ringtone in a telephony system comprising software code portions stored in an internal memory of a digital computer, which when run on the digital computer, directs the digital computer to:
receive a request at an electronic telephony device configured to provide voice communication with other devices;
in response to receiving the request, play the advertising ringtone on the electronic telephony device; and
in response to playing the advertising ringtone, selectively collect using the electronic telephony device, coverage information from a personal device in response to the advertising ringtone having a ringtone context to be measured, wherein the step of collecting coverage information comprises the steps of:
analyze a user profile, and an incoming signal to determine its content to identify the advertising ringtone as one of to be measured and not to be measured;
identify the personal device within a proximity of the electronic device wherein the proximity is determined using inaudible signals configured to use a short-distance protocol; and
in response to identifying the personal device and identifying the advertising ringtone as to be measured, gather using the electronic telephony device the coverage information from the personal device wherein the coverage information includes information comprising measuring a number of personal devices within range of the electronic telephony device playing the advertising ringtone to form a metric to be provided to telephony service providers.

18. The electronic telephony device of claim 1, wherein the request is an incoming telephone call.

19. The electronic telephony device of claim 18, wherein the advertising ringtone is included in the request.

20. A method for determining coverage of an advertising ringtone containing an advertisement in a telephony system, the method comprising the steps of:
receiving an incoming phone call by an electronic device;
in response to receiving the incoming phone call, playing the advertising ringtone on a speaker of the electronic device, wherein the advertising ringtone includes an advertisement that is played on the speaker prior to the phone call being answered at the electronic device;
in response to playing the advertising ringtone, when the advertising ringtone has a ringtone context to be measured, the electronic device selectively collecting coverage information from another electronic device within proximity of the electronic device wherein the proximity is determined using inaudible signals, wherein the coverage information includes information comprising measuring a number of personal devices within range of the electronic telephony device playing the advertising ringtone to form a metric to be provided to telephony service providers; and
sending the coverage information by the electronic device.

* * * * *